(12) United States Patent
Houldsworth et al.

(10) Patent No.: US 8,115,453 B2
(45) Date of Patent: Feb. 14, 2012

(54) METHOD AND APPARATUS FOR MANAGING ENERGY IN PLURAL ENERGY STORAGE UNITS

(75) Inventors: John Houldsworth, Reston, VA (US); Gary L. Stirk, Lakeland, FL (US)

(73) Assignee: Texas Instruments Northern Virginia Incorporated, Dallas, TX (US)

( * ) Notice: Subject to any disclaimer, the term of this patent is extended or adjusted under 35 U.S.C. 154(b) by 0 days.

(21) Appl. No.: 12/612,999

(22) Filed: Nov. 5, 2009

(65) Prior Publication Data

US 2010/0109610 A1 May 6, 2010

Related U.S. Application Data

(63) Continuation of application No. 10/478,757, filed as application No. PCT/US02/16560 on May 28, 2002, now Pat. No. 7,615,966.

(60) Provisional application No. 60/293,176, filed on May 25, 2001.

(51) Int. Cl.
*H02J 7/00* (2006.01)
(52) U.S. Cl. .................. 320/132; 320/118; 320/119
(58) Field of Classification Search .................. 320/118, 320/119, 132, 116
See application file for complete search history.

(56) References Cited

U.S. PATENT DOCUMENTS

| | | | |
|---|---|---|---|
| 5,578,927 A | 11/1996 | Perelle | |
| 5,631,534 A | 5/1997 | Lewis | |
| 5,638,002 A | 6/1997 | Perelle | |
| 5,701,068 A * | 12/1997 | Baer et al. | 320/119 |
| 5,710,504 A | 1/1998 | Pascual et al. | |
| 5,739,669 A | 4/1998 | Bruelhardt et al. | |
| 5,764,027 A * | 6/1998 | Harvey | 320/125 |
| 5,793,754 A * | 8/1998 | Houldsworth et al. | 370/276 |
| 6,037,750 A | 3/2000 | Von Novak | |
| 6,043,628 A | 3/2000 | Perelle et al. | |
| 6,150,795 A * | 11/2000 | Kutkut et al. | 320/118 |
| 6,184,656 B1 * | 2/2001 | Karunasiri et al. | 320/119 |
| 6,297,618 B2 | 10/2001 | Emori et al. | |
| 6,377,024 B1 | 4/2002 | Choy | |
| 7,193,392 B2 | 3/2007 | King et al. | |
| 7,378,818 B2 * | 5/2008 | Fowler et al. | 320/119 |
| 7,615,966 B2 | 11/2009 | Houldsworth et al. | |

FOREIGN PATENT DOCUMENTS

| | | |
|---|---|---|
| JP | 7322516 | 8/1995 |
| JP | 9135530 | 5/1997 |
| WO | WO02097945 | 12/2002 |

* cited by examiner

*Primary Examiner* — Richard V Muralidar
(74) *Attorney, Agent, or Firm* — William B. Kempler; Wade J. Brady, III; Frederick J. Telecky, Jr.

(57) ABSTRACT

A system for managing energy stored in a plurality of series connected energy storage units has a plurality of energy storage unit controllers, each controller being associated with one of the plurality of energy storage units, a balancing circuit between two of the energy storage units, the balancing circuit being controlled by at least one of the energy storage unit controllers, a serial electrical interface between the energy storage unit controllers for providing voltage isolated bi-directional communication, and a central controller in electrical communication with the energy storage unit controllers. A method for managing charge in a plurality of series connected energy storage units forming an energy storage device includes monitoring a current supplied to the energy storage device, determining at least one of a charging rate and a capacity of a first energy storage unit and a second energy storage unit in the energy storage device, and diverting current from the first energy storage unit to the second energy storage unit in response to the steps of monitoring and determining.

21 Claims, 8 Drawing Sheets

METHOD AND APPARATUS FOR MANAGING ENERGY IN PLURAL ENERGY STORAGE UNITS

CROSS-REFERENCE TO RELATED APPLICATIONS

This application is a continuation of U.S. application Ser. No. 10/478,757, filed Jun. 14, 2004 (now U.S. Pat. No. 7,615,966), which claims priority from PCT Application No. PCT/US2002/16560, filed May 28, 2002, and U.S. Provisional Application No. 60/293,176 entitled "DELTA-SIGMA SIGNAL PROCESSING," filed on May 25, 2001, the entire content of which is hereby incorporated by reference.

STATEMENT REGARDING FEDERALLY SPONSORED RESEARCH OR DEVELOPMENT (Not applicable)

THE NAMES OF THE PARTIES TO A JOINT RESEARCH AGREEMENT (Not applicable)

INCORPORATION-BY-REFERENCE OF MATERIAL SUBMITTED ON A COMPACT DISC (Not applicable)

BACKGROUND OF THE INVENTION

Not applicable

FIELD OF THE INVENTION

The present invention relates generally to managing energy in plural energy storage units. More particularly, the present invention relates to a method and system for managing energy in plural energy storage units in which individual energy storage units are each monitored and the charge in each unit equalized during charging and/or discharging.

BACKGROUND INFORMATION

Battery packs composed of multiple cells can use internal electronics to assist in managing performance and safety issues. Individual cells can be connected in series to provide higher battery pack voltages for high voltage applications (for example: for use in notebook computers and vehicles). Metal hydride cells, such as nickel metal hydride (NiMH), and lithium-based chemistries, such as Li-ion cells, can be damaged or even explode if undercharged or overcharged. Internal electronics can be used for safety reasons to maintain safe voltages, currents and temperatures within the battery pack.

Additional examples of uses for internal electronics in battery packs include gauging charge levels to determine remaining run time or charging time, managing the charge and discharge process, and communicating with a host device or appliance Individual cell voltages may not remain balanced (equal) across a series connected grouping of individual cells or group of cells. Rather, some cells can be over potential and other cells can be under potential as referenced to the voltage measured across all the cells. Therefore, batteries and battery packs can include circuitry to monitor individual cells and, for example, stop the current to the batteries or battery packs before damage occurs.

U.S. Pat. No. 5,631,534, the contents of which are herein incorporated by reference, discloses circuitry associated with a battery pack for controlling the voltage balance between cells. A balancing circuit can be used during the charging process to transfer energy from those cells which reach full charge first to those cells that are at a voltage less than full charge.

DESCRIPTION OF RELATED ART INCLUDING INFORMATION DISCLOSED UNDER 37 CFR 1.97 AND 1.98

(Not applicable)

BRIEF SUMMARY OF THE INVENTION

The present invention is directed to a system for managing energy in a plurality of energy storage units. In an exemplary embodiment, a system for managing energy stored in a plurality of series connected energy storage units comprises a plurality of energy storage unit controllers, each controller being associated with one of the plurality of energy storage units, a balancing circuit between two of the energy storage units, the balancing circuit being controlled by at least one of the energy storage unit controllers, a serial electrical interface between the energy storage unit controllers for providing voltage isolated bi-directional communication, and a central controller in electrical communication with the energy storage unit controllers.

In another exemplary embodiment, a system for managing energy stored in plural series connected energy storage units comprises first means for monitoring voltage across a first energy storage unit, second means for separately monitoring voltage across a second energy storage unit, and means for balancing charge among the first and second energy storage units by exchanging energy among the first and second energy storage units in response to the first and second monitoring means during at least one of charging and discharging of the first and second energy storage units, the charge balancing means including a reactive equalization circuit.

An exemplary method for managing charge in a plurality of series connected energy storage units forming an energy storage device, the method comprises monitoring a current supplied to the energy storage device, determining at least one of a charging rate and a capacity of a first energy storage unit and a second energy storage unit in the energy storage device, and diverting current from the first energy storage unit to the second energy storage unit in response to the steps of monitoring and determining.

BRIEF DESCRIPTION OF THE SEVERAL VIEWS OF THE DRAWING(S)

Objects and advantages of the invention will become apparent from the following detailed description of preferred embodiments in connection with the accompanying drawings, in which like numerals designate like elements and in which.

DETAILED DESCRIPTION OF THE INVENTION

Figure 1:
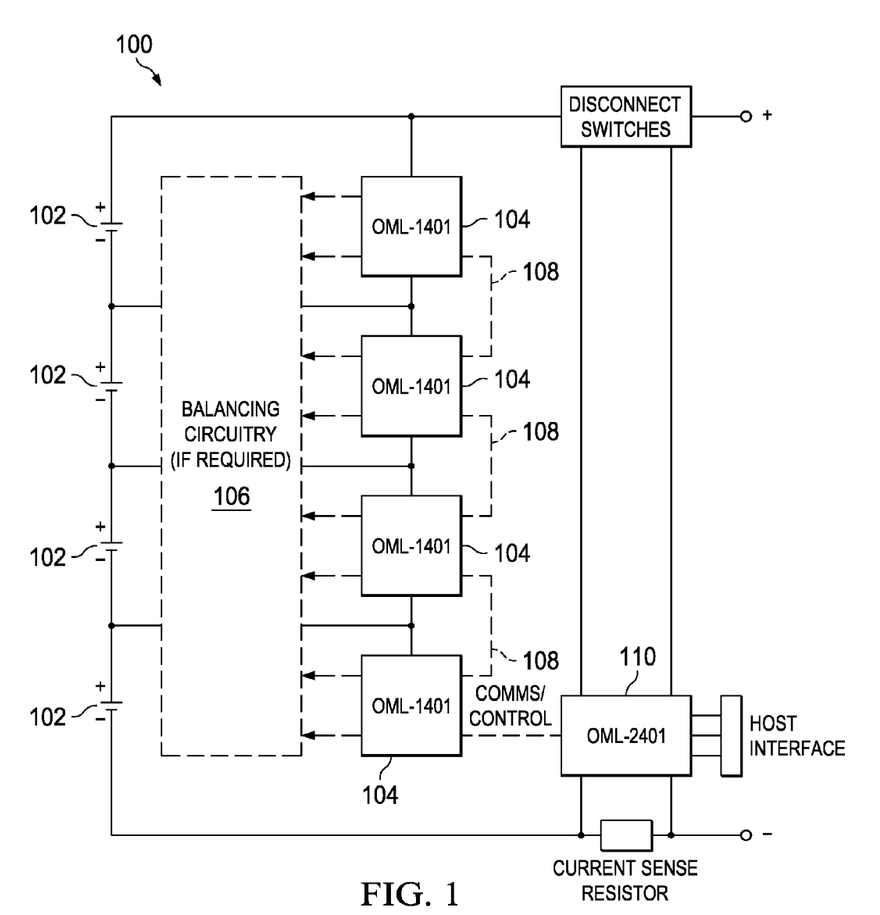
FIG. 1 is an exemplary embodiment of a system for managing energy in a plurality of series connected energy storage units.

FIG. 1 shows an exemplary system, represented in outline block diagram form as system 100, for managing energy in a plurality of series connected energy storage units, represented as energy storage units 102. The FIG. 1 system 100 includes a plurality of energy storage unit controllers 104, each controller being associated with one of the plurality of energy storage units 102. A balancing circuit 106 between two of the energy storage units 102 is controlled by at least one of the energy storage unit controllers 104. A serial electrical interface 108 between the energy storage unit controllers 104 provides voltage isolated bi-directional communication. A central controller 110 is in electrical communication with the energy storage unit controllers 104.

Figure 2A:
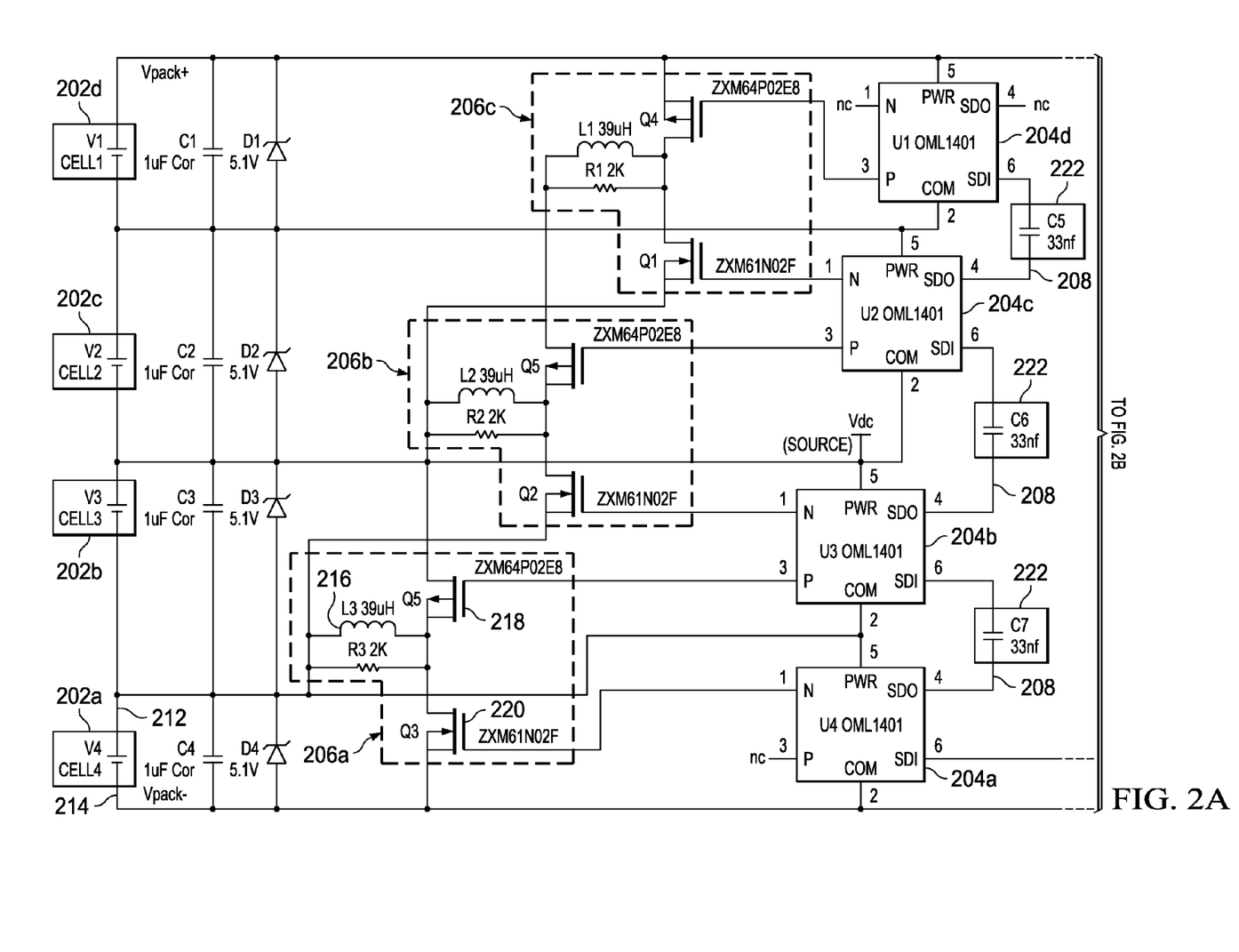
FIG. 2 is an exemplary embodiment of the FIG. 1 system for managing energy stored in a plurality of series connected energy storage units.
Figure 2B:
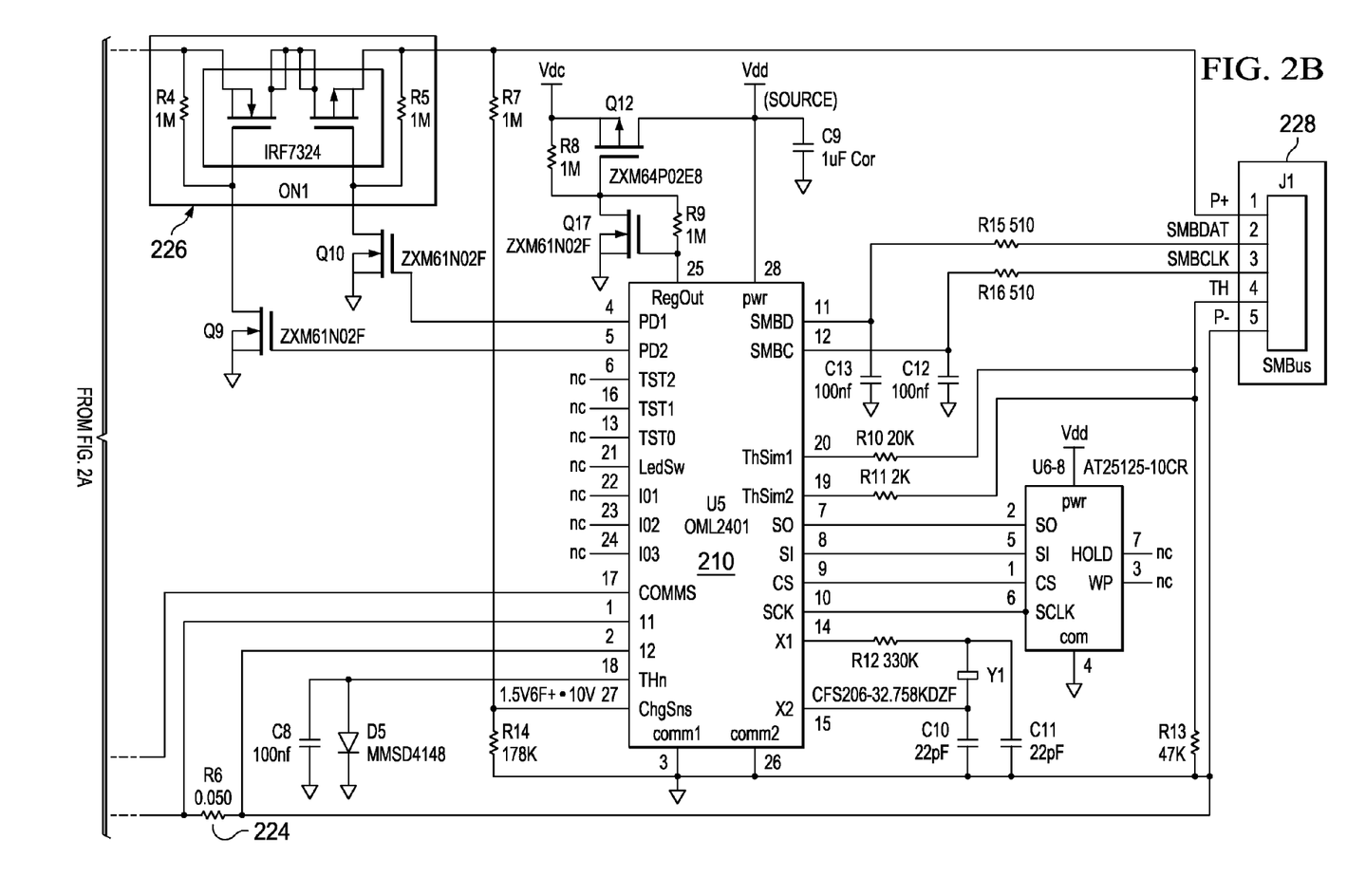

FIG. 2 is an exemplary embodiment of the FIG. 1 system for managing energy in a plurality of energy storage units. The FIG. 2 system 200 is shown as a detailed circuit. Multiple energy storage unit controllers 204 are shown as integrated circuits 204a, 204b, 204c, 204d. In the exemplary embodiment, the energy storage unit controllers can be integrated circuits that provide monitoring for associated energy storage units, represented by energy storage units 202a, 202b, 202c, 202d, and that provide balancing control via the balancing circuits 206a, 206b, 206c, 206d between adjacent energy storage units.

Figure 3:
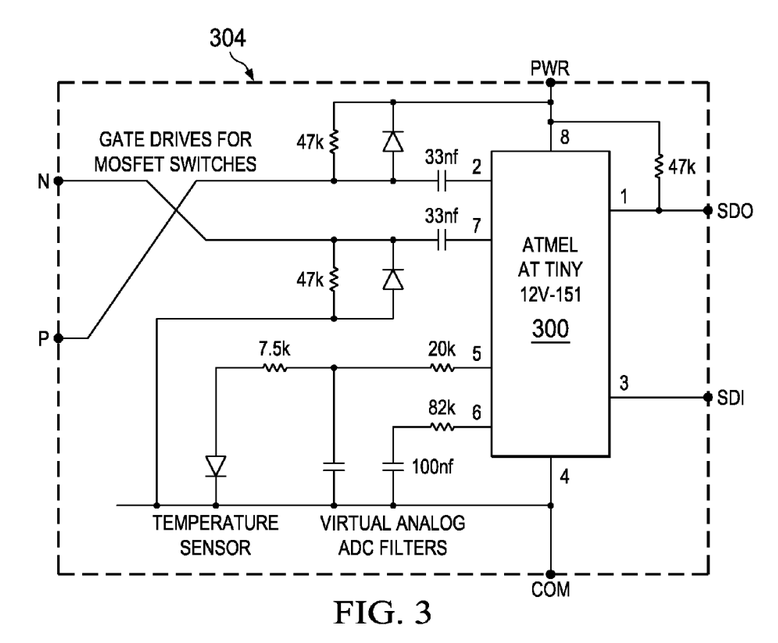
FIG. 3 shows an exemplary embodiment of a discrete component equivalent to the energy storage unit controller of FIG. 2.

The energy storage unit controller can be an integrated circuit, a plurality of separate integrated circuits, modules of discrete components, or hybrids thereof. For example, a suitable integrated circuit to be used as an energy storage unit controller is provided by Atmel and is designated ATtiny12 (part number ATtiny 12V-1 SC), available from Atmel Corporation of San Jose, Calif. Such a controller is programmed to perform the functions described herein, and is accompanied by support components such as those shown in FIG. 3. However, those skilled in the art will appreciate that any suitable energy storage unit controller can be used including custom designed integrated circuits. FIG. 3 is an exemplary embodiment of a discrete component equivalent to the controller 204 of FIG. 2. In the embodiment shown in FIG. 3, an Atmel ATtiny 12 microprocessor 300 is shown with associated discrete components that form the equivalent circuit 304.

The energy storage unit controller can monitor a parameter of the associated energy storage unit selected from the group consisting of voltage, temperature, current, and charge. For example, and as referenced to energy storage unit controller 204a, energy storage unit 202a can be monitored by connecting the high voltage side 212 of the energy storage unit, e.g., the positive pole, and the low voltage side 214, e.g., the negative pole, to the energy storage unit controller.

An exemplary balancing circuit includes a reactive element and a switch. In an exemplary embodiment shown in FIG. 2, balancing circuits 206a, 206b, 206c have a reactive element, such as inductor 216, and a first switch 218 and a second switch 220. In a closed position, the first switch 218 places the balancing circuit in parallel with a first energy storage unit. In the closed position, the second switch 220 places the balancing circuit in parallel with a second energy storage unit. The switch can be a FET, however, any suitable switch can be used. In the exemplary embodiment of FIG. 2, FET 220 and 218 include an internal parallel body diode (shown explicitly on FIG. 4), which can be used in cell balancing. The controller can operate the FET switch to charge the inductor from a first energy storage unit. The diode automatically conducts to a second energy storage unit, e.g., a destination energy storage unit, when the switch is turned off.

An energy storage unit controller can control the operation of the balancing circuit, e.g. operate the first and second switches to place the balancing circuit in parallel with a selected energy storage unit, to balance the charge between energy storage units. In an exemplary embodiment, the energy storage unit controller can support two balancing modes for the energy storage unit. In a first mode, excess energy within the energy storage unit during charging is burned off through a resistive burn-off process by, for example, the use of a resistive load. In another balancing mode, designated reactive pumping, excess energy from one cell is transferred to a second cell via the balancing circuitry during both charging and discharging.

Cell balancing and cell capacity correction can occur both during charging and discharging of the energy storage units. In an example of cell balancing during charging of the energy storage units, a first energy storage unit can have a higher voltage or a higher state of charge than a second energy storage unit. To balance the charge between the first and second energy storage units, the energy storage unit controller controls a switch to charge the reactive element, e.g., an inductor, within the balancing circuit from the first energy storage unit by, for example, applying a pulse cycle of a few microseconds to the switch. Subsequently, the same energy storage unit controller removes the pulse cycle and the switch opens. When the switch is opened, e.g., turned off, the voltage on the inductor 'flies-back' until the body diode in a switch for an adjacent second energy storage unit, e.g., the destination energy storage unit, conducts enabling the inductor to discharge into that energy storage unit. Thus, energy can flow from the controlled operation of the switch of the balancing circuit from a higher voltage energy storage unit to a lower voltage energy storage unit.

In an example of cell balancing during discharging of the energy storage units, a first energy storage unit can have a lower voltage or a lower state of charge than a second energy storage unit. To balance the charge between the first and second energy storage units, the energy storage unit controller controls a switch to charge the reactive element, e.g., an inductor, within the balancing circuit from the second energy storage unit by, for example, applying a pulse cycle of a few microseconds to the switch. Subsequently, the same energy storage unit controller removes the pulse cycle and the switch opens. When the switch is opened, e.g., turned off, the voltage on the inductor 'flies-back' until the body diode in a switch for an adjacent first energy storage unit, e.g., the destination energy storage unit, conducts enabling the inductor to discharge into that energy storage unit. Thus, energy can flow from the controlled operation of the switch of the balancing circuit from a higher voltage energy storage unit to a lower voltage energy storage unit.

This approach of only using active switches for the source and relying a catch diode is less efficient than two active switches but has a number of advantages: a) there is no need to provide any controlling pulse train at the destination switch, thus avoiding the need to tightly synchronize all the energy storage unit controllers which simplifies the system, contributes to reducing costs, and is more robust, e.g., reduces the chances of turning on two switches together and shorting out the cell; b) the energy storage unit controller can be supplied from the cell it is monitoring, e.g., supplied with 3-4.5 V, and, when in the exemplary embodiment of an integrated circuit, the voltages on the pins of the integrated circuit do not exceed the supply rails, allowing small feature size CMOS process to be used during manufacturing; and c) the inductor can be replaced by a resistive load for cost and size reduction without changing the control strategy.

In an exemplary embodiment, the energy storage unit comprises one or more energy storage cells, e.g., the energy storage unit can be either a single energy storage cell device or a multiple energy storage cell device. In an example of a single cell device, the energy storage unit can include one lithium-ion (Li-ion) cell. In an example of a multi-cell device, two or more nickel metal hydride (NiMH) cells can be connected in series to form the energy storage unit.

The energy storage unit can have an operational voltage within the range of approximately 1.8 volts to 5 volts. By keeping the voltage at or below about 5 volts, each controller can utilize integrated circuit feature sizes less than 0.5 microns, resulting in higher density integrated circuits and/or smaller integrated circuits.

An exemplary energy storage unit controller can have an input and an output for the serial electrical interface between the energy storage unit controllers. In the exemplary embodiment depicted in FIG. 2, the serial electrical interface 208 provides bi-directional communication amongst the energy storage unit controllers 204. The bidirectional communication can be digital communications, or can be any other mode of communication, such as analog communications. The serial electrical interface 208 is connected in series between the energy storage unit controllers 204 and each connection has an in-line capacitor 222 to provide voltage isolation.

In an exemplary embodiment, the system for managing energy in a plurality of energy storage units can include a central controller for controlling the energy storage unit controllers and the operation of the balancing circuit, monitoring a current in a current sense resistor in series with the energy storage units, and/or controlling a disconnect switch in series with the energy storage units. As illustrated in the FIG. 2 exemplary embodiment, the central controller 210 can be an integrated circuit. A suitable integrated circuit for use as a central controller is Atmel AT90LS4433 (product number AT90LS4433-4AC), available from Atmel Corporation of San Jose, Calif. Such a central controller can be substituted for the controller 210 of FIG. 2, and suitably programmed to perform the functions described herein. The supporting components shown in FIG. 2 can be retained, and supplemented by, for example, an operational amplifier in a path between resistor 224 and the analog-to-digital converter (ADC) within the Atmel controller, to amplify the measured voltage across the resistor 224. A separate program memory chip, such as the Atmel AT25128 program memory shown in FIG. 2 is included in the Atmel controller and need not be retained as a separate component. However, those skilled in the art will appreciate any suitable integrated circuit can be used as the central controller including custom designed controllers. In an exemplary embodiment, the central controller 210 is in electrical communication with the energy storage unit controllers 204. The central controller 210 can directly monitor the current in a current sense resistor 224. Further, the central controller 210 can be operatively interfaced to the disconnect switch 226, which is in series with the energy storage units 202. A host interface 228 for communication between the central controller 210 and another system, such as a computer, a recording system or a display system, can also be provided.

Figure 4:
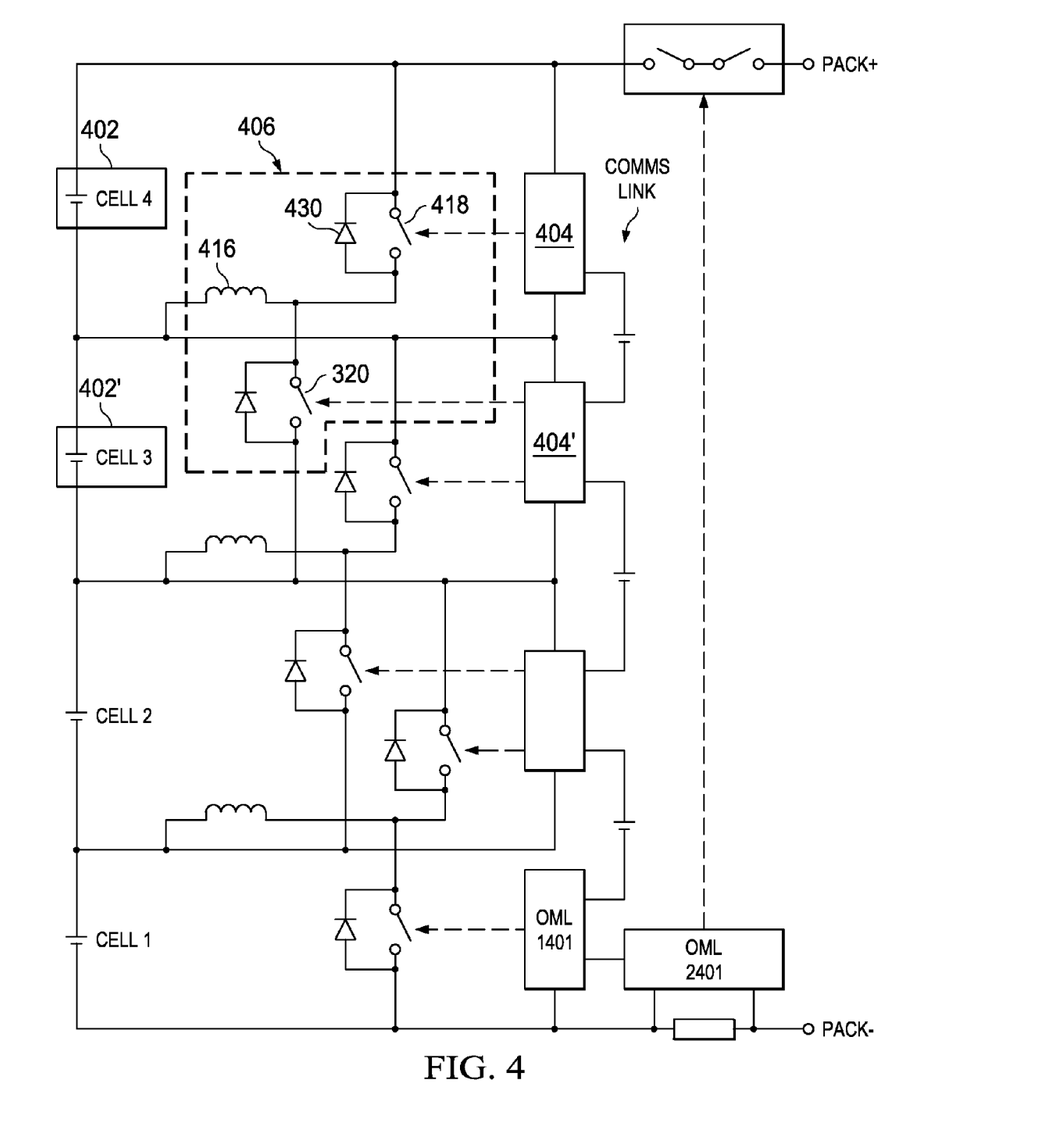
FIG. 4 is an exemplary embodiment of a balancing circuit.

FIG. 4 is an exemplary embodiment of a balancing circuit, represented by balancing circuit 406. In the exemplary embodiment shown, the balancing circuit 406 includes an inductor 416 and a switch 418 providing electrical contact with the energy storage unit 402. A diode 430 can be connected across the switch 416. A second switch 420 can also be included for providing electrical contact to a second energy storage unit 402'. The switches 418,420 can be controlled by at least one energy storage unit controller. Energy storage unit controller 404 controls switch 418 to close the balancing circuit 406 in parallel with energy storage unit 402 or to open the balancing circuit 406. Similarly, switch 420 is controlled by a second energy storage unit controller 404' to close the balancing circuit 406 in parallel with energy storage unit 402' or to open the balancing circuit 406. The energy storage unit controller operates one of two switches to connect one of two inductors to its associated energy storage unit and the choice of inductor is determined by the desired destination energy storage unit for the charge.

As illustrated in the exemplary embodiment of FIG. 2, a system for managing energy stored in a plurality of series connected energy storage units has a serial electrical interface 208 between the energy storage unit controllers 204, e.g., the energy storage unit controllers are serially connected with each other. Further, the serially connected energy storage unit controllers 204 can be further serially connected to the central controller 210. For example, the energy storage unit controllers 204 can be remote peripherals to the central controller 210 and can monitor at least one of one energy storage unit for an associated parameter, such as voltage, temperature, current and charge. Each energy storage unit controller 204 is powered from the energy storage unit 202 which it monitors and includes an ADC for measuring the cell and other voltages and controls for two switches 218, 220, e.g., power FETs, for energy transfer via the balancing circuit 206.

The serial electrical interface in an exemplary embodiment is a serial communication through each energy storage unit controller. The communication can be a point-to-point, two-way alternate link, e.g., a "daisy chain", whose parameters are independent of the number of nodes, e.g., controllers. Voltage isolation between the energy storage unit controllers, which are at different potentials, is provided by an AC coupling of simple logic level voltages. Thus, noise voltages between adjacent nodes, due to for example energy storage unit currents and impedances, are limited and independent of the total number of energy storage unit controllers.

The point-to-point link provided by the serial electrical interface builds up the communications solution in a layered approach. In an exemplary embodiment, the energy storage unit controllers are integrated circuits, each serial port uses a open drain (e.g., a logically OR link) to allow two-way signaling without contention. Sampling of both input/output ports can occur within a real time interval of the clock, and transfer of characters on a two-way alternate link can use asynchronous data format, e.g., start and stop bits.

Logic levels can be maintained across the AC coupling. In an exemplary embodiment, logic levels are maintained across the AC coupling using logic gates with an active clamp at the receiver to restore the DC levels. The quiescent level at each end of the link is logic '1'. For any data pattern asserted on the link the mean level at the receiver of the AC coupled pattern drifts to logic '1' voltage (with a time constant coupling) spoiling the received logic levels. The receiver voltage offset is shifted by voltage changes on the energy storage unit and is also subject to interference. The DC level at the receiver is restored by actively clamping the line to local zero when the transmit state is known to be a logic '0', that is, immediately following a '1' to '0' transition. The control for the clamp is implemented within the receive state machine on detecting a start bit. The clamp can be embodied by an open drain output which is turned on for two sample intervals (T/2, where T is the bit time). Restoring the DC level of logic '0' at the receiver maximizes the noise immunity to interference. With logic '0' restored, the noise immunity at logic '1' depends on the supply voltages for both the transmit and receive chips, i.e. adjacent cell voltages.

An exemplary method of operation assumes the link starts in the idle quiescent state (logic 1). A exemplary worse case condition for drift would be one transition per byte with data bits all zeroes—0000000001. Drift before next clamp≈$V_{logic} \times T_{byte}$/(T coupling) or about 10% of logic level with the suggested value for τ coupling. An exemplary best case condition for drift is with the highest mean value=011111111 (start bit followed by all ones). Drift during second half of start bit=$V_{logic} \times 0.5 \ast T_{bit}$/(τ coupling). Each time the active clamp applied for T/2, or 2×τ clamp, the drift is reduced to $(1/e)^2$ or to about 13% of its previous value where, for example, T is the bit time and the sample interval is T/4. When the link direction is reversed on alternate bytes, any residual offset is effectively reversed for the reverse direction as a starting point for subsequent drift. Thus, long term drift will tend to cancel (even without the active clamp) assuming up and down data streams are similar. The active clamp may be implemented at both ends, or just one end, of each link.

The serial electrical interface can provide bi-directional, two way alternate, using bit asynchronous transfer, byte synchronous logical ring with contra flow. A byte synchronous logic ring channel can be established through all the energy storage unit controllers using alternating bytes for the reverse flow direction. Further, the serial electrical interface can use a frame based transaction system. The frame based transaction system establishes a frame equal to:

FRAME=[<address><length><command><data>]

The FRAME can be parsed byte-by-byte with only the data field being modified as appropriate by the energy storage unit controller as the FRAME passes through the serial electrical interface. The fields of the FRAME are protected by check bits, and the energy storage unit controllers ignore bad addresses and command fields. An additional flag bit can distinguish the header character from the body character. In this approach, the relative position in the serial communication chain can be used to define the chip address. Finally, the logical ring returns the FRAME to the central controller to confirm the addresses and echoed command sequences are error free and to receive a modified data field based on the modification performed by the energy storage unit controllers. Further, any failed transactions detected by the central controller can be repeated.

In the serial communications scheme of the exemplary embodiment, AC coupling and voltage isolation can be provided by a small surface mount capacitor. The surface mount capacitor is placed in-line between each energy storage unit controller. Further, the byte synchronous communications can be used to calibrate the on chip oscillators in each energy storage unit controller against the crystal controlled timing of the central controller. This gives all controllers, e.g., the energy storage unit controllers and the central controller, accurate timing.

Figure 5:
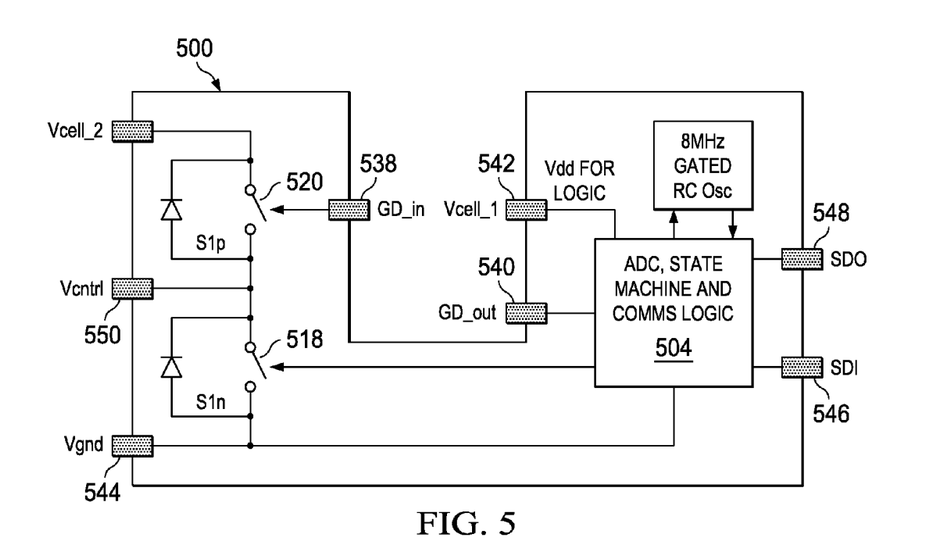
FIG. 5 is an exemplary embodiment in which the switches for a balancing circuit are integrated into the energy storage unit controller.

In an exemplary embodiment, the switches associated with the balancing circuit can be integrated with the energy storage unit controller. FIG. 5 is an exemplary embodiment of a energy storage unit controller with integrated switches, represented by controller 500. The energy storage unit controller with integrated switches 500 comprises an energy storage unit controller 504 and two switches, a first switch 518 and a second switch 520. The first switch 518 is associated with a first balancing circuit 532 in operable electrical communication with the first energy storage unit 502 and the second switch 520 is associated with a second portion 534 of the balancing circuit in operable electrical communication with a second energy storage unit '502'. As represented in FIG. 5, multiple energy storage unit controllers with integrated switches can be used in a multi-controller application to each control an associated energy storage unit. This can be used to provide a module for balance circuit control.

Figure 6A:
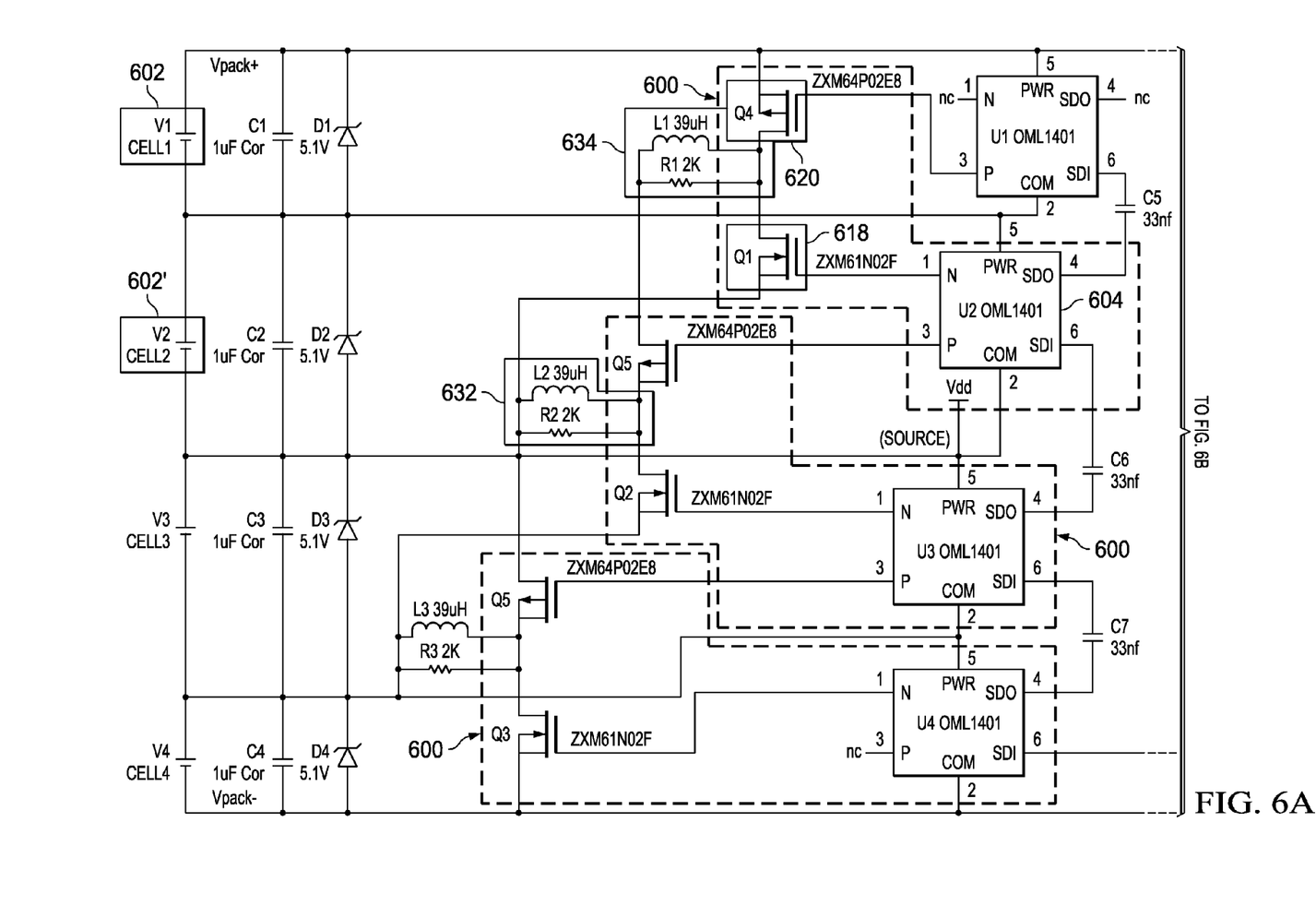
FIG. 6 is an exemplary embodiment of an energy storage unit controller with integrated switches.
Figure 6B:
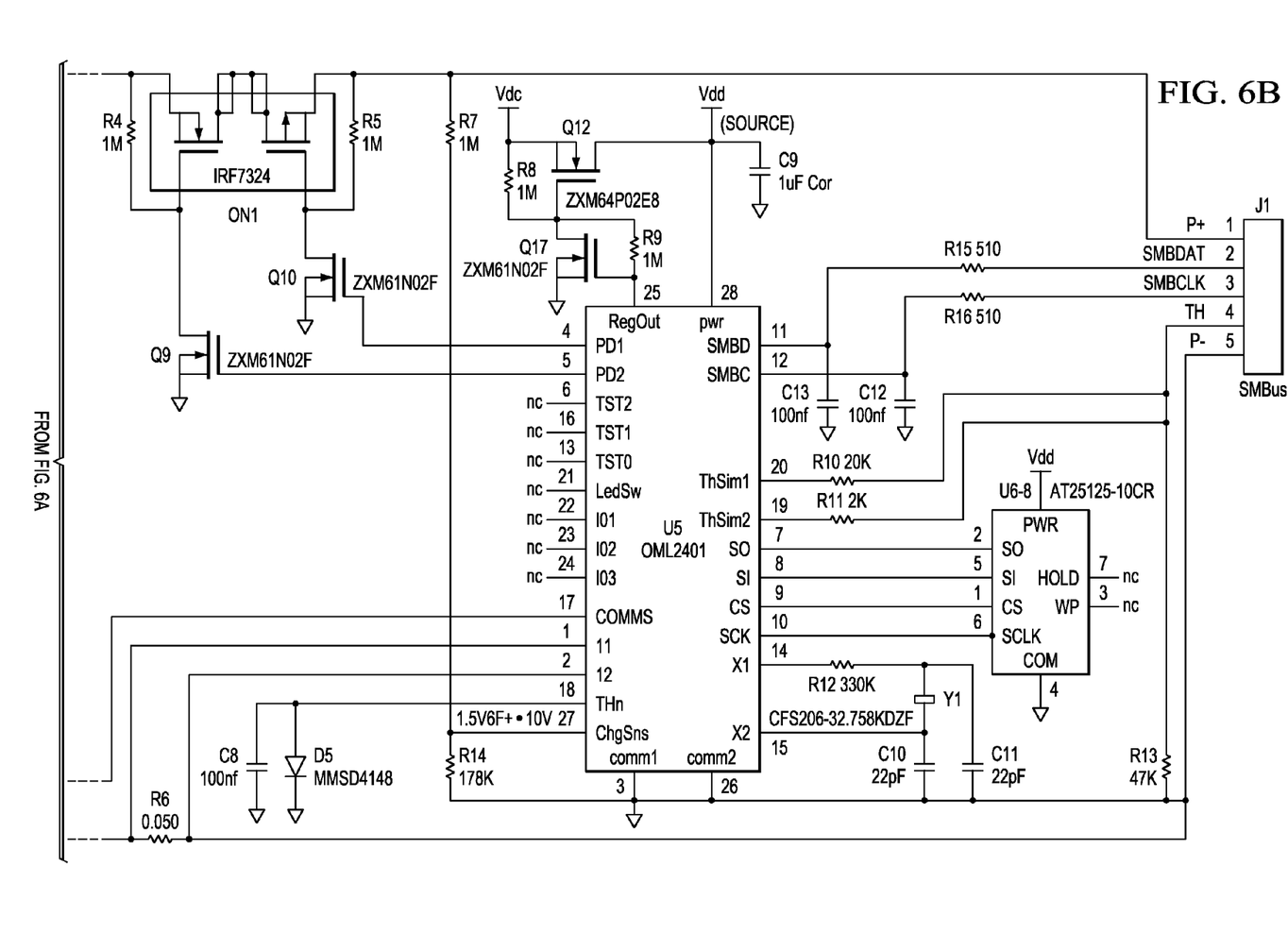

FIG. 6 is exemplary embodiment of an energy storage unit controller with integrated switches 600. An energy storage unit controller 604 in an operable communication with a first switch 618 and a second switch 620 electrically configured to be operated from the output of a subsequent integrated controller (not shown) through input line 638. The storage unit controller 604 is in operable communication with an output port 640 to be placed in operable communication with a switch in a second integrated controller (not shown). The integrated controller monitors a parameter, such as voltage, from an associated energy storage unit through monitoring connections 642 and 644. Input port 646 and output port 648 are operable for communicating via the serial electrical interface. Balance circuit connection 650 is electrically configured to operably communicate with the reactive element of the balancing circuit.

Both the first energy storage unit and the second energy storage unit are in operative electrical contact with the balancing circuit containing the first and second switches. Subsequent energy storage unit controllers with integrated switches interface with each other in a layered manner, e.g., the energy storage unit, the energy storage unit controller with integrated switches, and the balancing circuit are sequentially integrated such that a first energy storage controller provides an output to a subsequent energy storage controller to input to one of the integrated switches, and the subsequent energy storage controller provides an output to a subsequent energy storage controller to input to one of the integrated switches, and so forth.

Management of energy in plural energy storage systems can be in the form of balancing between two or more energy storage units. Balancing can be initiated at any time according to a control algorithm.

An exemplary algorithm, called Load Adaptive Pumping, can be based on voltage values captured during short term, voltage excursions due to load current changes and can be used to equalize a weighted point on the voltage excursion of each cell. The weighting can be a function of overall state of charge in each energy storage unit such that close to full charge, the maximums of the voltage excursions ($V_{max}$) are equalized, and close to full discharge, the minimums of the voltage excursions ($V_{min}$) are equalized. The maximum and minimum voltage values can decay according to a time constant ($V_K$) appropriate to the dynamics of the energy storage units, e.g., type of energy storage unit, size of load, and size of energy storage unit.

This load adaptive charge pump balancing algorithm can avoid unnecessary movement of charge due to energy storage units of different impedances developing voltage differences which merely reflect load changes and not charge imbalance.

This is in contrast to a balancing methodology based on instantaneous voltage alone that may not adequately account for the impedance differences between energy storage units, which can cause an energy storage unit to appear either overcharged or undercharged depending on how much load current flows.

In an exemplary embodiment, one energy storage unit controller is associated with two energy storage units. A balancing circuit between the two energy storage units are each controlled by the energy storage unit controller to provide load adaptive charge pump balancing to equalize energy storage unit voltages to within a predetermined hysteresis band ($V_H$). The hysteresis voltage is sufficient to avoid oscillation or "hunting" due to noise and pulse loads. An exemplary load adaptive charge pump balancing algorithm can be used to equalize the energy storage unit voltages.

The load adaptive charge pump balancing includes an iteration period having a measurement phase and a balancing phase. Each phase is governed by a global tick, for example, one second. During the measurement phase, no balancing current is permitted, and during the balancing phase, no measurement is permitted.

During the measurement phase, an energy storage unit controller stores a "direction of transfer" bit to indicate the direction of charge movement during the previous balancing period. In an exemplary embodiment in which the energy storage unit controller is an ATtiny12, available from Atmel Corporation of San Jose, Calif., both energy storage unit voltages are measured by a single Virtual Analog converter. The energy storage unit controller includes a flash programmable microcontroller, The measurement and control algorithm can be implemented in code to perform the functionality of the circuit shown in FIG. 5 as integrated controller 500.

For each of the two energy storage units, the energy storage unit controller measures the instantaneous energy storage unit voltage ($V_{n,meas}$). Both the highest and the lowest time decayed peak voltage, ($V_{n,max}$ and $V_{n,min}$) associated with each cell is calculated as decayed one increment by a time constant chosen for slow decay. The time constant ($V_K$) is parameter specific to the type of energy storage unit, the size of the energy storage unit and the size of the load. For example, the time constant can be 10-50 mV to allow a 100 mV peak voltage to decay in 2-10 seconds at a timing constant of 1 second. $V_{n,meas}$ is then compared to the time decayed peak voltages, and if $V_{n,meas} > V_{n,max}$ then $V_{n,max}$ is updated to $V_{n,meas}$. Similarly, if $V_{n,meas} < V_{n,min}$ then $V_{n,min}$ is updated to $V_{n,meas}$.

The weighted average of the voltage for each cell ($V_n$) is then calculated based on the peak values $V_{n,max}$ and $V_{n,min}$ and with reference to the actual voltage in relation to the operating range of voltages to the energy storage unit. For example, the weighted average changes as a function of the voltage of the energy storage unit with respect to the voltage operating range, e.g., the weighted average is approximately equal to $V_{n,max}$ when $V_{n,meas}$ is close to the maximum energy storage unit operating voltage ($V_{C,MAX}$), is approximately equal to $V_{n,min}$ when $V_{n,meas}$ is close to the minimum energy storage unit operating voltage ($V_{C,MIN}$). $V_{C,MAX}$ and $V_{C,MIN}$ are a function of the energy storage unit parameters, such as the chemistry system of the energy storage unit. There is a linear transition between $V_{C,MAX}$ and $V_{C,MIN}$ so that $V_n$ is equal to $(V_{n,min} + V_{n,meas})/2$ when $V_{n,meas}$ is midway between $V_{C,MAX}$ and $V_{C,MIN}$.

Whether charge is to be transferred during a balancing period is based on the differences between the weighted average of the voltages of each cell, for example, the difference between $V_1$ and $V_2$ in a two energy storage unit device (where $V_1$ and $V_2$ are the $V_n$ previously discussed). Thus, if $V_2 < (V_1 - V_H)$ then transfer of charge occurs from energy storage unit 1 to energy storage unit 2 via the balancing circuit. Similarly, if $V_1 < (V_2 - V_H)$ then transfer of charge occurs from energy storage unit 2 to energy storage unit 1 via the balancing circuit. Note, that no transfer will be allowed if the intended transfer represents a reversal of direction within the last $K_T$ period, During the balancing phase, the energy storage unit controller with two associated mosfet (FET) switches, Sp and Sn, controls the switches to switch the balancing inductor between energy storage unit 1 and energy storage unit 2, according to the results of the measurement period. For example, switch Sp can connect the inductor of the balancing circuit across energy storage unit 2 and switch Sn can connect the inductor of the balancing circuit across energy storage unit 1. To transfer charge from energy storage unit 1 to energy storage unit 2, the energy storage unit controller can pulse Sn; to transfer charge from energy storage unit 2 to energy storage unit 1, the energy storage unit controller can pulse Sp, If no charge is to be transferred, the energy storage unit will enter a standby mode until the next iteration of the measurement phase and balance phase.

Load adaptive charge pump balancing can be extrapolated from a one energy storage unit controller embodiment to an embodiment with two or more energy storage unit controllers. In an exemplary embodiment, a communication phase is added to the measurement phase and the balance phase. Thus, an iteration period can include the measurement phase, the communication phase and the balance phase. In an exemplary embodiment, the communication phase follows the measurement phase and precedes the communication phase.

An exemplary communication phase shares data with adjacent energy storage unit controllers to result in at least the energy storage unit controllers associated with any one balancing algorithm being informed of the voltage of each of its neighbor energy storage unit controllers. For example, energy storage unit controller N is aware of the voltage associated with energy storage unit controllers (N+1) and (N−1). This results in the every energy storage unit controller knowing which switch of the associated balancing circuit, e.g., Sn or Sp, to operate during the subsequent balancing phase within each iterative period.

In an exemplary embodiment, communication between adjacent energy storage unit controllers can be initiated by commands from a central controller. For example, on a "data move up" command, energy storage unit controller N will transmit the voltage of it associated energy storage unit ($V_n$) to energy storage unit controller (N+1), and receive the voltage of energy storage unit associated with energy storage unit controller (N−1) ($V_{n-1}$) from energy storage unit (N−1). On a "data move down" command, energy storage unit N will transmit the voltage of its associated energy storage unit N ($V_n$) to energy storage unit controller (N−1), and receive the voltage of energy storage unit (N+1) ($V_{n+1}$) from energy storage unit (N+1). Each message contains a "direction of transfer" bit to indicate direction of charge movement during the previous balancing period.

Energy storage unit controller N determines whether charge is to be transferred during the following balancing period, based on the differences between $V_{n-1}$, $V_n$ and $V_{n+1}$, and on the direction bit. For example, if $V_{n-1} < (V_n - V_H)$ then the energy storage unit controller operates to transfer charge from energy storage unit N to energy storage unit (N−1); if $V_{n+1} < (V_n - V_H)$ then the energy storage unit controller operates to transfer charge from energy storage unit N to energy storage unit (N+1). Note, that no transfer will be allowed if the intended transfer represents a reversal of direction within the last $K_T$ period.

In an exemplary embodiment of a balancing phase for an iteration period for a load adaptive charge pump balancing algorithm for two or more energy storage unit controllers with more than one energy storage unit controller, each energy storage unit controller with two associated mosfet (FET) switches, Sp and Sn, controls the switches to switch the balancing inductor between energy storage units. For example, energy storage unit controller N controls Sp switch of energy storage unit controller (N+1) to connect inductor N across energy storage unit (N+1), energy storage unit N has Sn switch to connector inductor N across energy storage unit N Likewise, each energy storage unit controller N has Sp switch controlled by energy storage unit controller (N−1), has Sn switch controlled by energy storage unit controller N, and controls the Sp switch of energy storage unit controller (N−1). If no charge is to be transferred, the energy storage unit can enter a standby mode until the next iteration of the measurement phase and balance phase.

In exemplary embodiments, each energy storage unit controller can transfer charge only away from its associated energy storage unit and into adjacent energy storage units. The two energy storage unit controllers at the ends of the series of energy storage unit controllers, e.g., the energy storage unit controllers not bounded on each side by a next energy storage unit, compensate for the lack of a neighbor. For example, during the "assign address" phase of communications, the energy storage unit controllers at the ends of the series are identified and subsequently these two energy storage unit controllers will modify their communications. The energy storage unit controller at position N=1, e.g., the first energy storage unit controller, does not attempt to communicate with energy storage unit controller (N−1), e.g., nonexistent energy storage unit controller N=0, nor does it compare voltage with, nor transfer charge to nonexistent energy storage unit controller N=0. Similarly, the last nonexistent energy storage unit controller in the series does not attempt to communicate with a non-existent higher energy storage unit controller, nor does it compare voltage with, nor transfer charge to nonexistent energy storage unit controller.

The energy storage unit controller can be preloaded with parameters stored in, for example, non-volatile memory (EEPROM). Examples of suitable parameters to preload include: the mode (e.g., number of energy storage unit controllers, presence of a central controller, and so forth), historical data such as time since last cold start, total charge transferred within the device, maximum and minimum volts, and so forth, the limits of the operating range of energy storage unit voltage, '$V_{C,MAX}$ and $V_{C,MIN}$' voltage hysteresis, $V_H$ (millivolts), voltage peak decay constant, $V_K$ (millivolts) and the timing constant, $K_T$.

In another exemplary embodiment of a balancing algorithm, energy storage unit balancing can be achieved by noting that the state of charge of two energy storage units may differ for at least two reasons: a) the energy storage units have identical capacity but have a different initial charge, and b) the energy storage units may have had the same charge at one point in time, but due to a difference in capacity, as load current flows, each energy storage unit's state of charge, as expressed as a fraction of its own capacity, becomes unequal.

In the above exemplary embodiments, the balancing algorithm has been described as distributed amongst the energy storage unit controllers. However, other exemplary embodiments can centralize the balancing algorithm, perform the algorithm processes, and communicate commands to perform balancing functions back to the individual energy storage unit controllers. For example, the voltages of the energy storage units can be made available to a master controller, which can be the central controller or a separate controller, in communication with the energy storage unit controllers.

Thus with multiple energy storage units in a series string, with each energy storage unit of slightly differing capacity, the lowest capacity energy storage unit will reach its limits before the others and therefore define the capacity energy storage device.

The control of charge movement is separated from the cell voltages for a more robust scheme which can anticipate imbalance before it actually occurs. A simplified description of this exemplary embodiment is as follows:

First, the individual energy storage unit capacities are learned as the energy storage device goes through a charge/discharge cycle. Slight differences in energy storage unit capacity are then used to determine individual energy storage unit balancing currents as a function of the common device current supplying the load or coming from the charger.

In this arrangement, balancing is based on two terms: a) energy storage unit voltage or the weighted excursion as discussed above is used to determine the first term, and b) a proportion of the load current scaled according to a learned capacity delta is used for the second term. These terms are summed and applied to the energy storage units by means of the current pump. Since the current pump operates at a single rate, time-proportioning can be used to apply a variable amount of balancing. The capacity deltas are learned by taking the first term (e.g., voltage based balance current flowing away from the cell) and correlating it with device current. For example, it can be correlated with change in state of charge (time integral of load current) in an adaptive control loop which attempts to drive the first term to zero. The correlation can comprise multiplication followed by integration. By using modulo arithmetic, the output of the integrator can be allowed to overflow naturally. It can be shown that this overflow does not affect the net output in the subsequent comparison of the capacity deltas. Thus it is not necessary to accurately know the amount of balancing current (the control loop will compensate if the estimate is wrong) and only the device current need be measured. To generate both the voltage based and capacity based terms, in each case the corresponding parameters are compared to those of the adjacent cells, since the balancing current only flows between adjacent cells. The parameters from adjacent cells and the value of load current are made available via the chip to chip communications.

Figure 7:
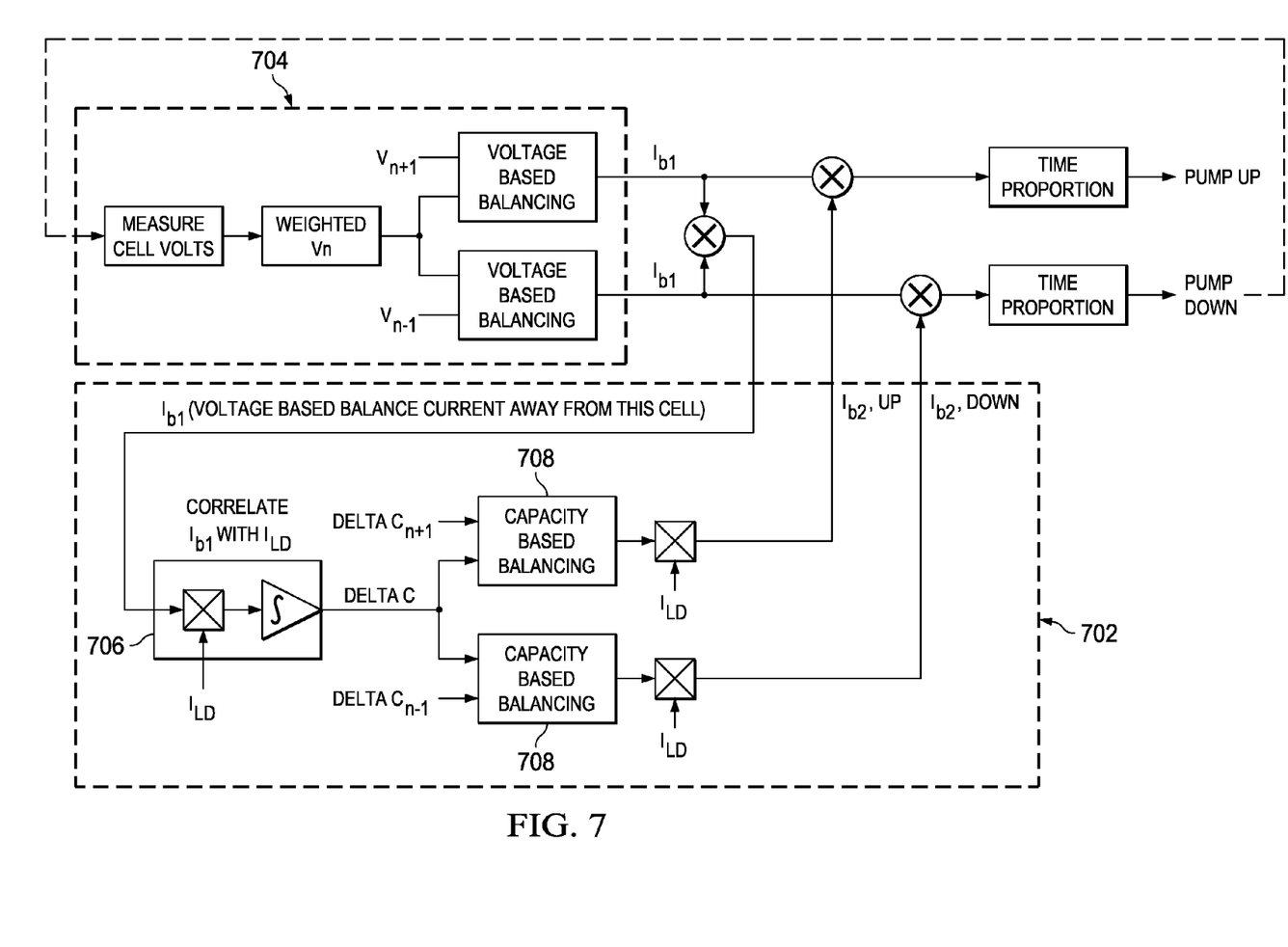
FIG. 7 shows an exemplary embodiment of an adaptive balancing circuit.

In an alternate embodiment illustrated in FIG. 7, an adaptive balancing circuit is included to preemptively anticipate a balancing current by adaptively learning (e.g., estimating) an energy storage unit's capacity. This estimated capacity is learned over time for a given energy storage unit as a function of the energy storage unit's weighted voltage and as a function of the load current. For each energy storage unit, the estimated capacity is determined for use in assessing a modification of the energy storage unit's balancing currents.

In FIG. 7, the adaptive balancing circuit 700 is implemented with a second feedback loop 702, which supplements a first feedback loop 704, for each energy storage unit. The first feedback loop 704 for each given energy storage unit corresponds to the balancing current that is determined as a function of energy storage unit's weighted voltage, e.g., the voltage based balancing term ($I_{b1}$). As in other embodiments, the voltage based balancing current $I_{b1}$ is used to modify the charge/discharge rate of the given energy storage unit for a given load current. The second feedback loop 702 is used to preemptively assess what adaptive balancing current $I_{b2}$ will be required for multiple energy storage units in an energy storage device to, for example, achieve a more robust charge/discharge performance.

The second feedback loop 702 can, for example, be configured as an integrator 706 that produces an adaptively estimated capacity (Delta C) of the given energy storage unit. The Delta C is then compared (in absolute terms or in relative terms) to the values for neighboring energy storage units (Delta $C_{n+1}$ and Delta $C_{n-1}$) in comparator 708, either a single or multiple comparators can be used. The comparison allows the algorithm to determine a preferred pumping direction amongst the compared energy storage units, e.g., the Delta C is compared to the adjacent values Delta $C_{n+1}$ and Delta $C_n$ and determines if charge should be transferred from one of the cells to another of the cells, or, if the cells are balanced within the tolerance range, then no charge is transferred between those balanced energy storage units. For a given weighted voltage and load current, the balancing circuit 700 can anticipate how much of a balancing current $I_{b2}$ should be supplied/diverted to/from the energy storage unit to achieve balanced charging and discharging of the energy storage unit relative to other energy storage units in the energy storage device.

The second loop 702 can be considered to use a differentiation of a differential loop of a proportional/differential controller. That is, in operation, the second loop monitors the polarity of the balancing current supplied/diverted to the energy storage unit with which it is associated for a given weighted voltage of the energy storage unit and the load current. To implement this second loop, the energy storage unit controller of the given energy storage unit can receive an input representing a value of the load current, $I_{LD}$. The energy storage unit controller can, over time, monitor the balancing current supplied to the energy storage unit as a function of this load current and as a function of the weighted voltage of the energy storage unit. Using this information, the energy storage unit controller can estimate the capacity of the energy storage unit relative to its neighbors.

For example, assume the given energy storage unit is charged to a weighted voltage $V_w$. If the energy storage unit requires a balancing current be supplied to it from the preceding energy storage unit during initiation of a load current $I_{LO}$, the controller can determine that the energy storage unit has greater capacity than the preceding energy storage unit. If the accumulated balancing current supplied to the energy storage unit during a charge or discharge cycle to achieve full charging of both the given energy storage unit and the neighboring energy storage unit has been previously determined to last for a given percentage of the energy storage unit's charging cycle (e.g., 5%), the capacity of the energy storage unit can be initially considered to be 5% greater than that of the preceding energy storage unit, Upon subsequent charging cycles and/or discharging cycles, this 5% value can be repeatedly adjusted until it settles to a final value. The differential value of the energy storage unit's estimated capacity relative to that of its neighboring energy storage unit can be stored, and then adaptively modified throughput operation. The value willlikely settle, to a substantially fixed value (e.g., ±10%) over time.

The energy storage unit controller can combine, e.g., sum or multiply, the voltage based balancing current $I_{b1}$ and the adaptive balancing current $I_{b2}$, and provide an input signal to regulate the operation of the balancing circuit. Based on the input signal, for example, based on the input signal value or polarity, the energy storage unit controller can operate the balancing circuit. Through feedback to the cell voltage measurement, the duration and/or the amplitude of $I_{b2}$ can be increased or decreased in future charge/discharge cycles by updating a stored value representing the relative energy storage unit's capacity in the memory of the energy storage unit controller. For each comparison, the capacity can be incremented/decremented by a fixed relative capacity "X", corresponding to a % (e.g., 0.1%).

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A system for managing energy stored in a plurality of series connected energy storage units, the system comprising:
   a plurality of energy storage unit controllers, each controller being associated with one of the plurality of energy storage units;
   a current pump to transfer energy between two of the energy storage units independent of the difference in voltage between them, the current pump being controlled by at least one of the energy storage unit controllers;
   a measurement circuit having a measuring function indicative of a state of charge of at least one of the energy storage units;
   a central controller in electrical communication with the energy storage unit controllers, the central controller being coupled to the measurement circuit for receiving the indications of the state of charge and having a charge movement function whereby energy storage unit imbalance can be anticipated before it occurs; and
   an electrical interface between the energy storage unit controllers for providing bi-directional communication to control the energy storage unit controllers to transfer energy between energy storage units.

2. The system of claim 1, wherein the energy storage unit comprises one or more storage cells.

3. The system of claim 1, wherein the energy storage unit controller monitors a parameter of the associated energy storage unit selected from the group consisting of voltage, temperature, and current.

4. The system of claim 1, wherein the current pump includes a reactive element and at least one switch, the switch being controlled by at least one of the energy storage unit controllers.

5. The system of claim 1, wherein a voltage monitored by any one energy storage unit controller is no more than 5 V.

6. The system of claim 1, wherein the communications are digital communications.

7. The system of claim 1, comprising a current sense resistor in series with the energy storage units.

8. The system of claim 7, wherein the measurement circuit monitors a current in the current sense resistor.

9. The system of claim 1, comprising a disconnect switch in series with the energy storage units.

10. The system of claim 9, wherein the disconnect switch is operatively interfaced to a control chip.

11. The system of claim 1, wherein the storage unit controllers can be a separate integrated circuit, a discrete component, or a hybrid of an integrated circuit and a discrete component.

12. The system of claim 1, wherein the integrated circuit can be in a multichip module.

13. The system of claim 1, wherein the serial electrical interface provides bidirectional, two way alternate, using bit asynchronous transfer, byte synchronous logical ring with contra flow.

14. A system for managing energy stored in plural series connected energy storage units comprising:
- first means for monitoring voltage across a first energy storage unit;
- second means for separately monitoring voltage across a second energy storage unit; and
- means for transferring charge between each individual one of the first and second energy storage units independent of the difference in voltage between them by exchanging energy among the first and second energy storage units in response to the first and second monitoring means during at least one of charging and discharging of the first and second energy storage units, the charge transferring means including a reactive equalization circuit;
- means for providing a measurement function indicative of a state of charge of at least one of the first and second energy storage units; and
- means for controlling the first and second means for monitoring voltage wherein the means for controlling includes a central controller for receiving the indication of a state of charge and having a charge movement function whereby energy storage unit imbalance can be anticipated before it occurs; and
- means for bi-directional communications between the first and second monitoring means to control the first and second monitoring means to transfer energy between the first and second energy storage units.

15. The system of claim 14, wherein the first monitoring means monitors a temperature of the first energy storage unit.

16. The system of claim 14, wherein the second monitoring means monitors a temperature of the second energy storage unit.

17. The system of claim 14, wherein the charge transferring means includes an inductor, at least one switch and a diode connected across each switch.

18. The system of claim 14, comprising means for monitoring current in the plural series connected energy storage units.

19. The system of claim 14, comprising means for voltage isolated bidirectional communications between each means for voltage monitoring.

20. The system of claim 14, wherein the communications are digital communications.

21. A method for managing charge in a plurality of series connected energy storage units forming an energy storage device, the method comprising:
- measuring a current supplied to the energy storage device;
- determining at least one of a charging rate and a capacity of a first energy storage unit and a second energy storage unit in the energy storage device;
- receiving in a central controller the determination of at least one of the charging rate and capacity of the first and second energy storage units, the central controller having charge movement function whereby energy storage unit imbalance can be anticipated before it occurs; and
- transferring energy from each individual one of the first and second energy storage units to another individual one of the first and second energy storage units independent of the difference in voltage between them in response to the steps of measuring and determining.

* * * * *